(12) United States Patent
Ide

(10) Patent No.: US 7,403,242 B2
(45) Date of Patent: Jul. 22, 2008

(54) LIQUID CRYSTAL DISPLAY MODULE, MOBILE COMMUNICATION DEVICE, AND METHOD OF MOUNTING LIQUID CRYSTAL DISPLAY MODULE

(75) Inventor: Katsuhisa Ide, Tokyo (JP)

(73) Assignee: NEC Corporation, Tokyo (JP)

( * ) Notice: Subject to any disclaimer, the term of this patent is extended or adjusted under 35 U.S.C. 154(b) by 53 days.

(21) Appl. No.: 10/927,001

(22) Filed: Aug. 27, 2004

(65) Prior Publication Data
US 2005/0046766 A1    Mar. 3, 2005

(30) Foreign Application Priority Data
Aug. 27, 2003  (JP) ............................. 2003-302228

(51) Int. Cl.
G02F 1/1333  (2006.01)
G02F 1/1335  (2006.01)

(52) U.S. Cl. .......................... 349/58; 349/95

(58) Field of Classification Search .................. 349/58, 349/65, 64; 362/361, 612
See application file for complete search history.

(56) References Cited

U.S. PATENT DOCUMENTS 5,808,708 A * 9/1998 Oyama et al. ................. 349/65
5,835,139 A * 11/1998 Yun et al. ...................... 349/58
6,064,455 A * 5/2000 Kim ............................. 349/113
6,888,595 B2 * 5/2005 Umemoto .................... 349/113
6,919,937 B2 * 7/2005 Kim et al. ..................... 349/58
6,992,733 B1 * 1/2006 Klein ........................... 349/58

FOREIGN PATENT DOCUMENTS

| CN | 1330497 A | 1/2002 |
| CN | 2484703 Y | 4/2002 |
| EP | 1 158 347 A2 | 11/2001 |
| EP | 1 310 820 | 5/2003 |
| JP | 5 080334 | 4/1993 |
| JP | 07-099394 * | 4/1995 |
| JP | 11-184392 | 7/1999 |
| JP | 2002 055329 | 6/2002 |
| WO | WO 03/014816 | 2/2003 |

* cited by examiner

*Primary Examiner*—James A Dudek
(74) *Attorney, Agent, or Firm*—Young & Thompson

(57) ABSTRACT

An LCD module principally has an LCD, a backlight module including an LED section, an optical waveguide, and a light reflector. The side faces of the backlight module are provided with fixing sections to mount and fix the LCD module to a case by fastening screws. Since the LCD's display section has a smaller outward form than the LCD, the LCD module is fixed to the case using the fixing sections on the side faces of the backlight module so as not to affect the LCD display section. This enables a space for packaging any other functions to be secured, the frame to be narrowed, and the device to be miniaturized without the need for any special attaching parts.

12 Claims, 7 Drawing Sheets

LIQUID CRYSTAL DISPLAY MODULE, MOBILE COMMUNICATION DEVICE, AND METHOD OF MOUNTING LIQUID CRYSTAL DISPLAY MODULE

BACKGROUND OF THE INVENTION

1. Field of the Invention

The present invention relates to a liquid crystal display module, a mobile communication device using the same, and a method of mounting a liquid crystal display (hereinafter referred to as LCD) module to be used as a display section in the mobile communication device.

2. Description of the Related Art

A conventional LCD module 12 of a mobile communication device is assembled so that the LCD module 12 is sandwiched between an upper case 11a and a lower case 11b of the mobile communication device as shown in FIG. 1. With regard to a method of mounting the LCD module 12, the LCD module 12 is mounted in the cases 11 by fixing four corners of each of the cases 11a and 11b by screws 13a through 13d with the LCD module 12 sandwiched between the cases 11 (11a, 11b) as shown in FIG. 2.

Further, for miniaturization of a liquid crystal display unit, technologies of decreasing the width of a peripheral edge portion (frame portion) which surrounds a liquid crystal display section, i.e., so-called frame-narrowing technologies have been proposed. For the purpose of such frame narrowing technologies, the following method of mounting an LCD module to a case has been proposed (e.g. Japanese Patent Laid-Open Publication No. Hei 11-184392). Namely, U-shaped brackets are placed so that their central main portions overlap both the right and left sides of the LCD module, and then the U-shaped brackets are attached to the LCD module by fixing the bended portions at both ends of the U-shaped brackets to the upper and lower sides of the LCD module by screws. The LCD module is then mounted to the case of the liquid crystal display unit by fixing the case to the U-shaped brackets through screws holes provided in the main portions of the U-shaped brackets.

However, according to a conventional method of mounting an LCD module, the LCD module comprises an LCD, an optical waveguide, a backlight module including a light emitting diode (hereinafter referred to as LED), and a main substrate. In this configuration, when a larger LCD screen and increased functions of a mobile communication device are demanded, an increase in the number of parts to be mounted in the liquid crystal display unit tends to cause a problem of having difficulty in mounting the LCD module in the mobile communication device.

On the other hand, according to the method described in the above-mentioned Japanese Patent Laid-Open Publication No. Hei 11-184392, the U-shaped brackets are used to fix the LCD module to the case, and therefore a space for setting the U-shaped brackets is needed. For this reason, the above-mentioned method does not provide a satisfactory solution to the problem of having difficulty in mounting the LCD module in the mobile communication device, as well as has limitations in the frame narrowing.

SUMMARY OF THE INVENTION

It is therefore an object of the present invention to provide a liquid crystal display module, a mobile communication device using the same, and a method of mounting a liquid crystal display module, which can secure a space for packaging any other functions, achieve a frame-narrowing, and miniaturize a liquid crystal display unit, without the need for any special attaching parts.

A liquid crystal display module according to the present invention comprises: a liquid crystal display; and a backlight module which includes a light emitting diode which serves as a light source of a backlight for the liquid crystal display. Said backlight module is configured to accommodate the liquid crystal display and is provided with a fixing section on a side face thereof to fix the liquid crystal display module to a case by a fixing member.

A mobile communication device according to the present invention uses as a display section the liquid crystal display module as disclosed herein, and the case is a case for the mobile communication device.

Another mobile communication device according to the present invention comprises: a first case; a second case freely rotatably attached to the first case. And the liquid crystal display module as disclosed herein is mounted as a display section in the first case.

The fixing member is, for example, a screw which can be removed from the case and/or a wedge which cannot be removed from the case.

A method of mounting a liquid crystal display module according to the present invention comprises the steps of: housing the liquid crystal display in a backlight module which includes a light emitting diode serving as a light source of a backlight for the liquid crystal display to constitute a liquid crystal display module; and fixing the liquid crystal display module to a case by a fixing member through a fixing section provided on a side face of the backlight module.

The case is, for example, a case for a mobile communication device.

Alternatively, the case is, for example, a first case of a mobile communication device which includes the first case and a second case rotatably connected to the first case.

Further, the fixing member is, for example, a screw which can be removed from the case and/or a wedge which cannot be removed from the case.

In a conventional LCD module as a display section of a mobile communication device, a space for mounting by fastening screws provided on the outside of the LCD module and a space for setting special attaching parts such as a U-shaped bracket, in a plan view, are necessary. According to the present invention, the liquid crystal display module is fixed to the case through the fixing section provided on the side face of the backlight module. Consequently, such conventionally required spaces become unnecessary. Therefore, it is possible to secure a space for packaging any other functions, to narrow the frame, and to miniaturize the entire device without the need for any special attaching parts, thereby permitting improvement in the functionality.

DETAILED DESCRIPTION OF THE PREFERRED EMBODIMENT

Figure 3:
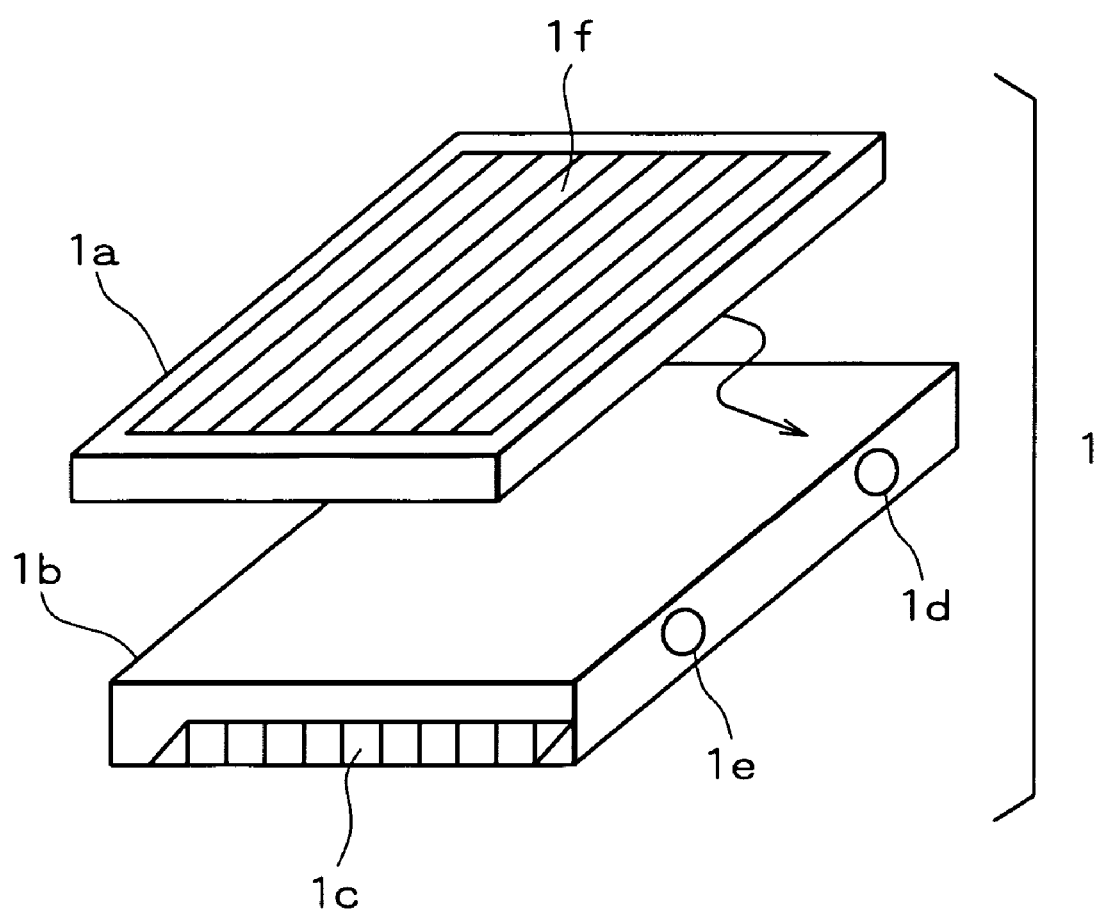
FIG. 3 is a perspective view showing an assembled condition of an LCD module according to an embodiment of the present invention.
Figure 4:
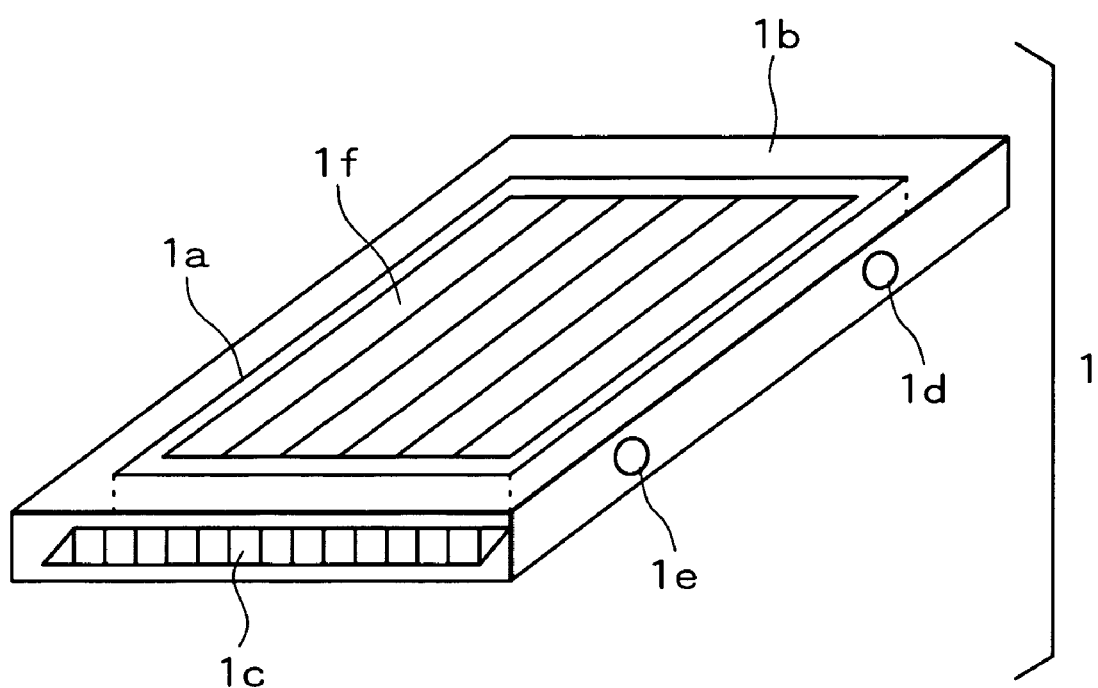
FIG. 4 is a perspective view of the LCD module according to the embodiment of the present invention.
Figure 5:
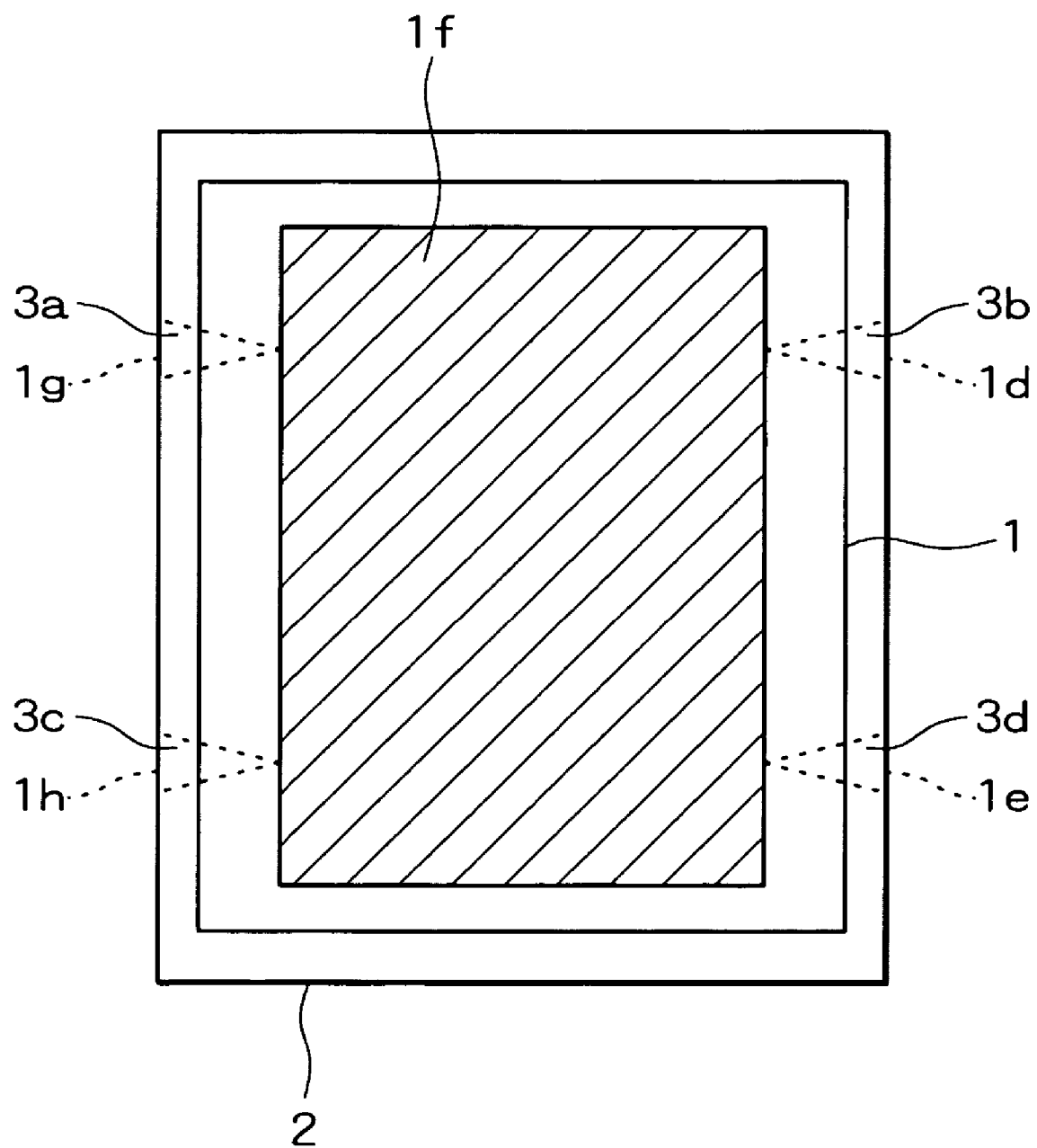
FIG. 5 is a plan view showing an example of mounting of the LCD module to a case according to the embodiment of the present invention.
Figure 6:
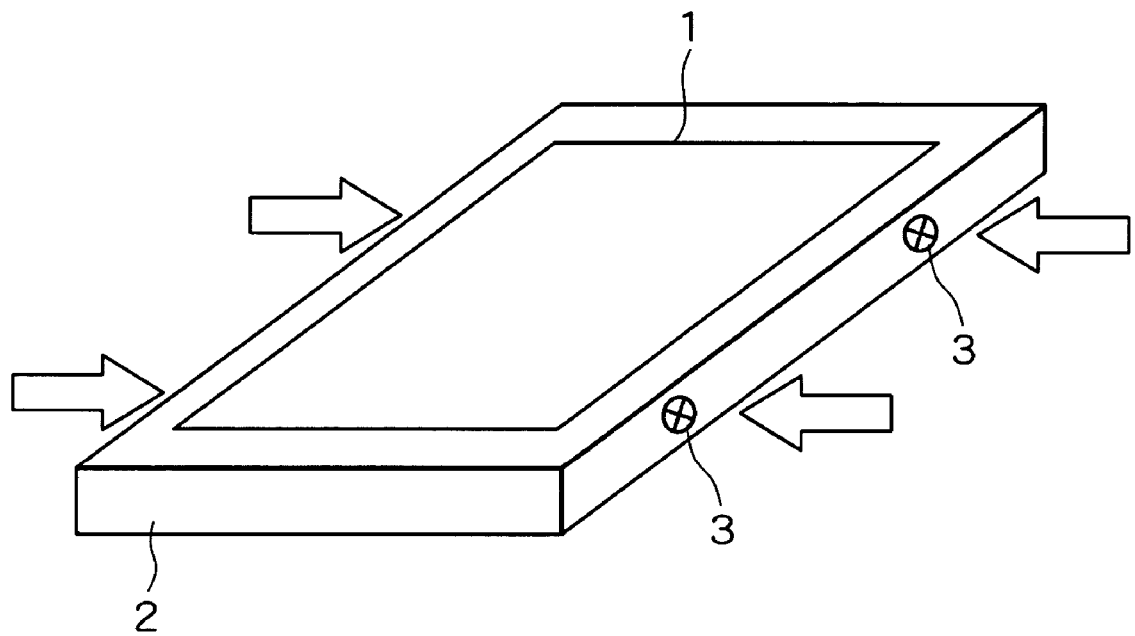
FIG. 6 is a perspective view showing an example of mounting of the LCD module to the case according to the embodiment of the present invention.

Preferred embodiments of the present invention will be now described with reference to the accompanying drawings. FIG. 3 is a perspective view showing an assembled condition of an LCD module 1 according to an embodiment of the present invention. FIG. 4 is a perspective view of the LCD module 1 of the embodiment. FIG. 5 is a plan view of the LCD module 1 of the embodiment. FIG. 6 is a schematic diagram illustrating a force to be applied to the LCD module 1. The LCD module 1 is used, for example, as a display section of a folding cellular phone or the like constructed by rotatably connecting two cases together.

The LCD module 1 principally comprises an LCD 1a, a backlight module 1b provided with an LED section 1c, an optical waveguide (not shown), and a light reflector (not shown). The LCD 1a, the optical waveguide, and the light reflector or the like are housed in the backlight module 1b. The LCD 1a has a non-display section along its peripheral edge portion and the area excluding this non-display section is an LCD display section 1f.

The side faces of the backlight module 1b are provided with fixing sections 1d, 1e, 1g, and 1h to mount and fix the LCD module 1 to a case (not shown). An LED (not shown) of the LED section 1c mounted in the backlight module 1b is a light source of a backlight for the LCD 1a.

As shown in FIG. 5, the LCD module 1 is fixed to a case 2 by screws 3(3a through 3d) at the fixing sections 1d, 1e, 1g, and 1h provided on the side faces of the backlight module 1b.

In this case, since the LCD display section 1f has a smaller outward form than the LCD 1a, the LCD module 1 is fixed to the case 2 using the fixing sections 1d, 1e, 1g, and 1h on the side faces of the backlight module 1b so as not to affect the LCD display section 1f.

More specifically, in accordance with the present embodiment, the LCD module 1 is fixed, using the side faces of the LCD module 1, to the case 2 from the side faces by screws 3 (3a through 3b), as shown in FIG. 6. As a member to fix the LCD module 1, screws which can be removed from the case 2 or wedges which cannot be removed from the case 2 may be used, or these two types may be combined.

Figure 1:
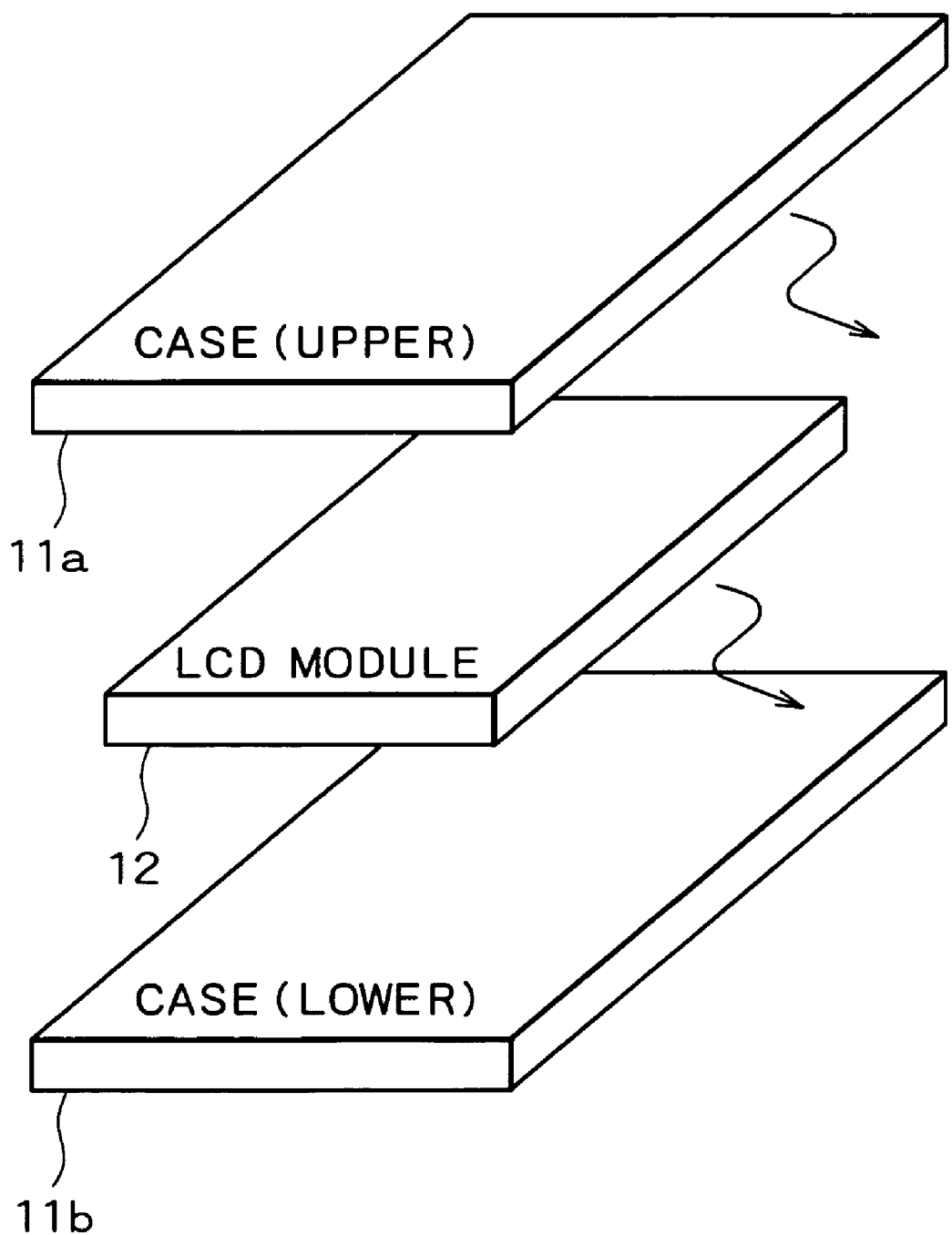
FIG. 1 is a perspective view showing an example of mounting of a conventional LCD module to a case.
Figure 2:
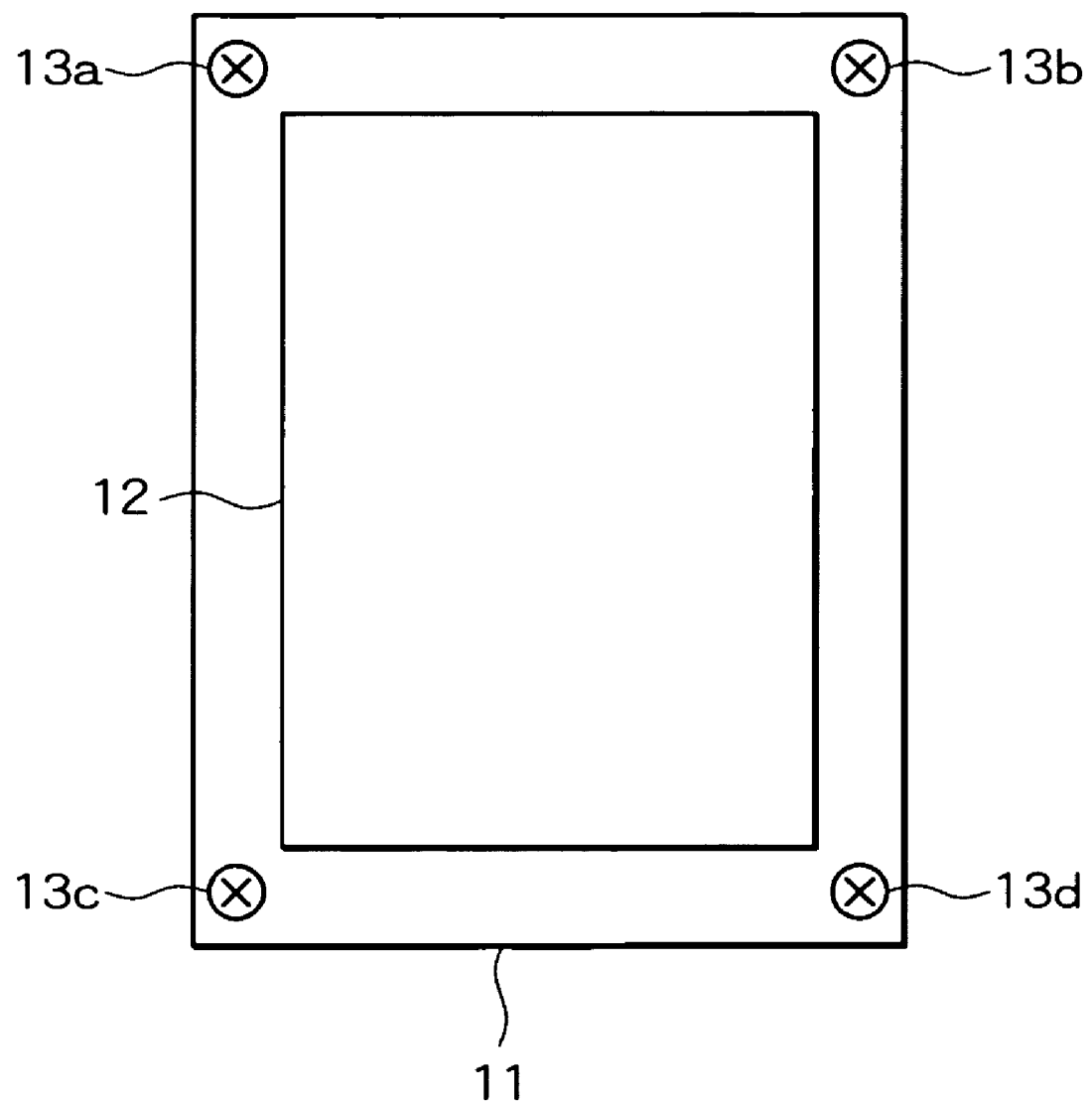
FIG. 2 is a plan view showing an example of mounting of a conventional LCD module to a case.

This feature of the present embodiment eliminates the need for the space, in a plan view, for fixing the LCD module 1 at four places on its outside using screws 13a through 13d, which space is required in the conventional liquid crystal display shown in FIG. 2, thereby making it possible to miniaturize the liquid crystal display, as well as the mobile communication device itself. If the mobile communication device is not designed to be reduced in size, the space required for fixing by the fastening screws 13a through 13d can be used for other parts, and consequently the functionality of the mobile communication device can be improved without changing its size.

Figure 7:
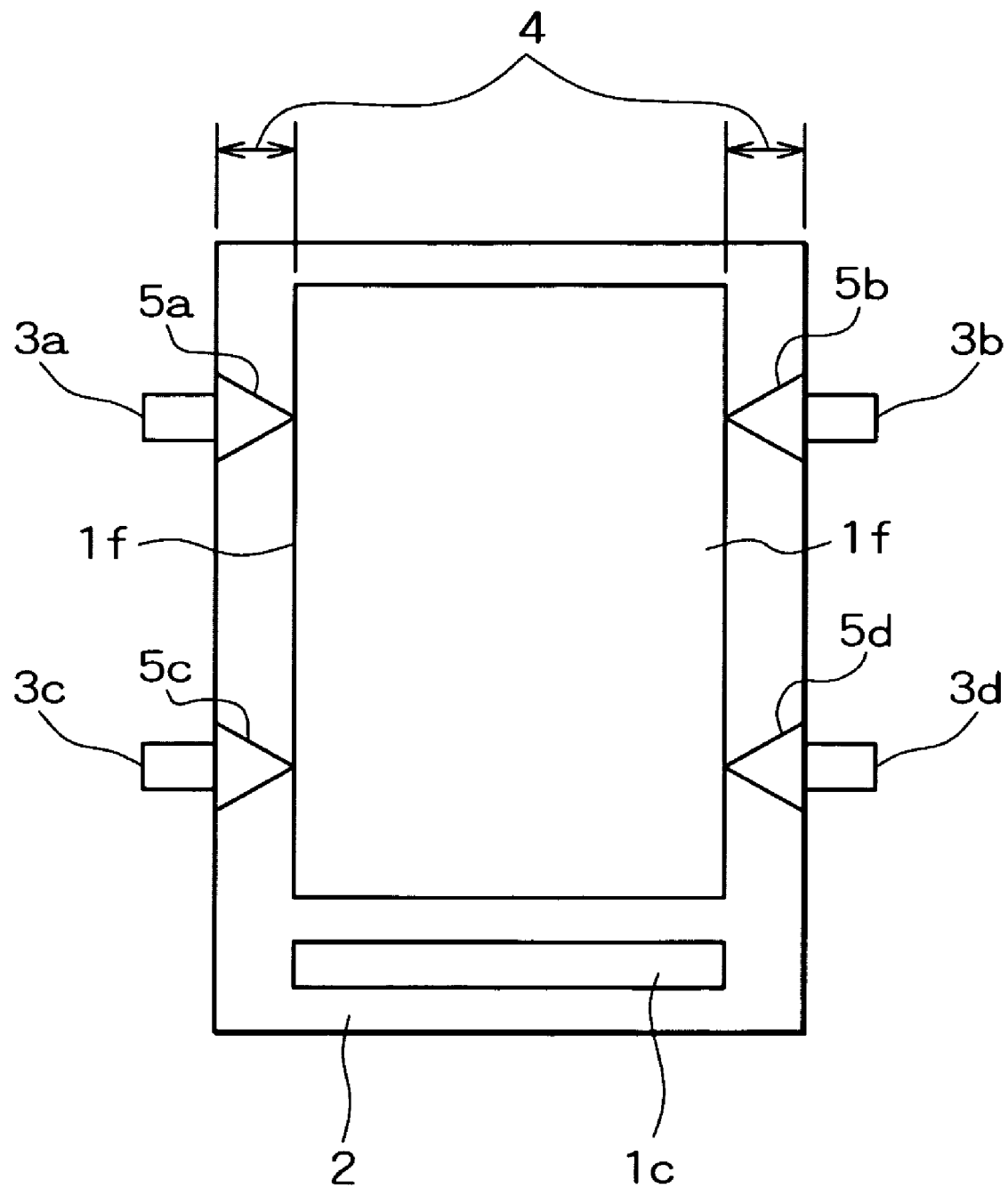
FIG. 7 is a plan view showing a mounted condition of the LCD module to the case according to the embodiment of the present invention.

FIG. 7 is a plan view showing a mounted condition of the LCD module 1 shown in FIG. 3 to a case. FIG. 7 illustrates a positional relationship between the LED area 1c and the LCD display section if, and the case 2. Between the LCD display section if and the case 2, there is an area 4 which is irrelevant to display and which begins from both sides of the case 2.

The area 4 which is irrelevant to display is used chiefly for bonding an optical waveguide and for mounting liquid crystal driving parts for the LCD 1a and is irrelevant to the displaying of the LCD 1a. The irrelevant-to-display area 4 is used as areas 5a through 5d for fixing by the fastening screws 3a through 3d, from the side faces. In addition, the LCD module 1 may have any other circuit boards integrally mounted.

As described above, with the present embodiment, the LCD module 1 is fixed to the case 2 by the fastening screws 3a and 3b at the fixing areas 1d, 1e, 1g, and 1h on the side faces of the backlight module 1b. Consequently, the space for fixing by the fastening screws 13a through 13d on the outside of the conventional LCD module 12 as shown in FIG. 2 becomes unnecessary, and it is thus possible to package any other functions in that space and to miniaturize the device. Therefore, the present embodiment enables a space for packaging any other functions to be secured, the frame to be narrowed, and the device to be miniaturized without the need for any special attaching parts.

What is claimed is:

1. A liquid crystal display module comprising:
   a liquid crystal display; and
   a backlight module having a light emitting diode which serves as a light source of a backlight for the liquid crystal display, said backlight module being configured to house the liquid crystal display within the backlight module, and being provided with a fixing section on a side face thereof to fix the liquid crystal display module to a case by a fixing member, so that said backlight module is enclosed within said case, said light emitting diode and said liquid crystal display being coplanar.

2. The mobile communication device using as a display section the liquid crystal display module according to claim 1, wherein
   the case is a case for the mobile communication device.

3. A mobile communication device comprising:
   a first case;
   a second case freely rotatably attached to the first case; and
   a display section in the first case, said display section being constituted by the liquid crystal display module according to claim 1.

4. The mobile communication device according to claim 2, wherein
   the fixing member is a screw which can be removed from the case and/or a wedge which cannot be removed from the case.

5. The mobile communication device according to claim 3, wherein
   the fixing member is a screw which can be removed from the case and/or a wedge which cannot be removed from the case.

6. A method of mounting a liquid crystal display module comprising the steps of:
   housing the liquid crystal display in a backlight module which includes a light emitting diode serving as a light source of a backlight for the liquid crystal display to constitute a liquid crystal display module, said light emitting diode being coplanar with said liquid crystal display; and
   fixing said liquid crystal display module to a case by a fixing member through a fixing section provided on a side face of the backlight module.

7. The method of mounting a liquid crystal display according to claim 6, wherein the case is a case for a mobile communication device.

8. The method of mounting a liquid crystal display according to claim 6, wherein the case is a first case of a mobile communication device which includes the first case and a second case rotatably connected to the first case.

9. The method of mounting a liquid crystal display module according to claim 6, wherein the fixing member is a screw which can be removed from the case and/or a wedge which cannot be removed from the case.

10. The method of mounting a liquid crystal display module according to claim 7, wherein the fixing member is a screw which can be removed from the case and/or a wedge which cannot be removed from the case.

11. The method of mounting a liquid crystal display module according to claim 8, wherein the fixing member is a screw which can be removed from the case and/or a wedge which cannot be removed from the case.

12. A mobile communication device, comprising:

a liquid crystal display;

a backlight module having a light source for lighting the liquid crystal display, said liquid crystal display being housed within said backlight module and being coplanar with said light source; and a case screwed to a side face of said backlight module.

* * * * *